US009509465B2

(12) United States Patent
Park et al.

(10) Patent No.: US 9,509,465 B2
(45) Date of Patent: Nov. 29, 2016

(54) MULTI-CHANNEL COMMUNICATION STATION FOR COMMUNICATING A MULTI-CHANNEL PPDU AND METHODS OF REDUCING COLLISIONS ON SECONDARY CHANNELS IN MULTI-CHANNEL WIRELESS NETWORKS

(71) Applicants: Minyoung Park, Portland, OR (US); Robert J. Stacey, Portland, OR (US)

(72) Inventors: Minyoung Park, Portland, OR (US); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 233 days.

(21) Appl. No.: 13/949,517

(22) Filed: Jul. 24, 2013

(65) Prior Publication Data
US 2013/0308580 A1    Nov. 21, 2013

Related U.S. Application Data

(63) Continuation of application No. 12/825,843, filed on Jun. 29, 2010, now Pat. No. 8,531,980.

(51) Int. Cl.
*H04W 4/00* (2009.01)
*H04L 5/00* (2006.01)
*H04W 74/08* (2009.01)
*H04L 12/801* (2013.01)

(52) U.S. Cl.
CPC ............. *H04L 5/0044* (2013.01); *H04L 47/10* (2013.01); *H04W 74/0816* (2013.01)

(58) Field of Classification Search
CPC ..................... H04W 74/0808; H04W 74/0816

USPC ................................................. 370/252, 329
See application file for complete search history.

(56) References Cited

U.S. PATENT DOCUMENTS

| 8,531,980 B2 | 9/2013 | Park et al. |
| 2005/0025131 A1 | 2/2005 | Ko et al. |
| 2005/0068979 A1 | 3/2005 | Boer et al. |

(Continued)

FOREIGN PATENT DOCUMENTS

| CN | 1700689 A | 11/2005 |
| CN | 1761175 A | 4/2006 |

(Continued)

OTHER PUBLICATIONS

"Chinese Application Serial No. 201180032625.0, Amendment filed Jun. 28, 2013", w/English claims, 16 pgs.

(Continued)

*Primary Examiner* — Kan Yuen
(74) *Attorney, Agent, or Firm* — Schwegman Lundberg & Woessner, P.A.

(57) ABSTRACT

Embodiments of a very-high throughput communication station and method for communicating on a primary channel and up to three or more secondary channels are generally described herein. Short-preamble detection may be performed during a contention window to detect packet transmissions on any one of the secondary channels starting within the contention window. Guard-interval detection is also performed during the contention window to detect a guard interval of a packet transmission on any one of the secondary channels. The short-preamble detection and the guard-interval detection may be performed concurrently during the contention window to determine if any of the secondary channels are busy.

15 Claims, 4 Drawing Sheets

(56) References Cited

U.S. PATENT DOCUMENTS

| | | | |
|---|---|---|---|
| 2005/0141406 | A1 | 6/2005 | Maltsev et al. |
| 2006/0146869 | A1 | 7/2006 | Zhang et al. |
| 2007/0242782 | A1 | 10/2007 | Han et al. |
| 2008/0019458 | A1 | 1/2008 | Kuo et al. |
| 2008/0043671 | A1 | 2/2008 | Moon et al. |
| 2009/0190465 | A1 | 7/2009 | Porat et al. |
| 2009/0225876 | A1 | 9/2009 | Sung et al. |
| 2010/0118716 | A1 | 5/2010 | Lakkis et al. |
| 2010/0316175 | A1 | 12/2010 | Zeng et al. |
| 2011/0116364 | A1 | 5/2011 | Zhang et al. |
| 2011/0116401 | A1* | 5/2011 | Banerjea et al. ............ 370/252 |
| 2011/0317674 | A1 | 12/2011 | Park et al. |
| 2012/0263137 | A1 | 10/2012 | Walton et al. |

FOREIGN PATENT DOCUMENTS

| | | |
|---|---|---|
| CN | 105072701 A | 11/2015 |
| JP | 2005244840 A | 9/2005 |
| JP | 2006222608 A | 8/2006 |
| RU | 2569313 C2 | 10/2015 |
| WO | WO-2005006697 A1 | 1/2005 |
| WO | WO-2006117150 A1 | 11/2006 |
| WO | WO-2007137277 A2 | 11/2007 |
| WO | WO-2012006035 A2 | 1/2012 |
| WO | WO-2012006035 A3 | 1/2012 |

OTHER PUBLICATIONS

"European Application Serial No. 11804098.9, Amendment filed Aug. 23, 2013", 14 pgs.
"Russian Application Serial No. 2012155706, Response filed Apr. 4, 2014 to Office Action mailed Feb. 4, 2014", 21 pgs.
"Russian Application Serial No. 2012155706, Office Action mailed Feb. 7, 2014", w/English translation, 8 pgs.
"U.S. Appl. No. 12/825,843, Advisory Action mailed Apr. 12, 2013", 3 pgs.
"U.S. Appl. No. 12/825,843, Final Office Action mailed Mar. 1, 2013", 5 pgs.
"U.S. Appl. No. 12/825,843, Non Final Office Action mailed Nov. 5, 2012", 8 pgs.
"U.S. Appl. No. 12/825,843, Notice of Allowance mailed May 10, 2013", 10 pgs.
"U.S. Appl. No. 12/825,843, Response filed jan. 22, 2013 to Non Final Office Action mailed Nov. 1, 2012", 12 pgs.
"U.S. Appl. No. 12/825,843, Response filed Mar. 26, 2013 to Final Office Action mailed Mar. 1, 2013", 12 pgs.
"U.S. Appl. No. 12/825,843, Response filed Sep. 25, 2012 to Restriction Requirement mailed Aug. 27, 2012", 10 pgs.
"U.S. Appl. No. 12/825,843, Restriction Requirement mailed Aug. 27, 2012", 6 pgs.
"International Application Serial No. PCT/US2011/042052, International Preliminary Report on Patentability mailed Jan. 17, 2013", 8 pgs.
"International Application Serial No. PCT/US2011/042052, Search Report mailed Jan. 18, 2012", 3 pgs.
"International Application Serial No. PCT/US2011/042052, Written Opinion mailed Jan. 18, 2012", 6 pgs.
"Specification Framework for TGac", IEEE P802.11 Wireless LANs, (May 2010).
Kim, Youhan, "Enhanced CCA for Non-Primary Channels Using Guard Interval", doc.: IEEE 802.11-10/0012r0, (Jan. 6, 2010), 13 pgs.
"Chinese Application Serial No. 201180032625.0, Office Action mailed Nov. 26, 2014", W/ English Translation, 13 pgs.
"Chinese Application Serial No. 201180032625.0, Response filed Apr. 10, 2015 to Office Action mailed Nov. 26, 2014", W/ English Claims, 24 pgs.
"European Application Serial No. 08157213.3, Response filed Sep. 29, 2015 to Examination Notification Art. 94(3) mailed May 27, 2015", 16 pgs.
"European Application Serial No. 11804098.9, Examination Notification Art. 94(3) mailed May 27, 2015", 3 pgs.
"European Application Serial No. 11804098.9, Extended European Search Report mailed May 26, 2014", 4 pgs.
"European Application Serial No. 11804098.9, Response filed Dec. 23, 2014 to Extended European Search Report mailed May 26, 2014", 19 pgs.
"European Application Serial No. 15185412.2, Extended European Search Report mailed Dec. 23, 2015", 8 pgs.
"Japanese Application Serial No. 2013-144168, Office Action mailed Jul. 8, 2014", W/ English Translation, 4 pgs.
"Japanese Application Serial No. 2013-144168, Office Action mailed Dec. 9, 2014", W/ English Translation, 8 pgs.
"Japanese Application Serial No. 2013-144168, Response Office Action mailed Jul. 8, 2014", W/ English Claims, 12 pgs.
"Legacy Coexistence—A Better Way?", IEEE 802.11-07/3001r0, (2008).

* cited by examiner

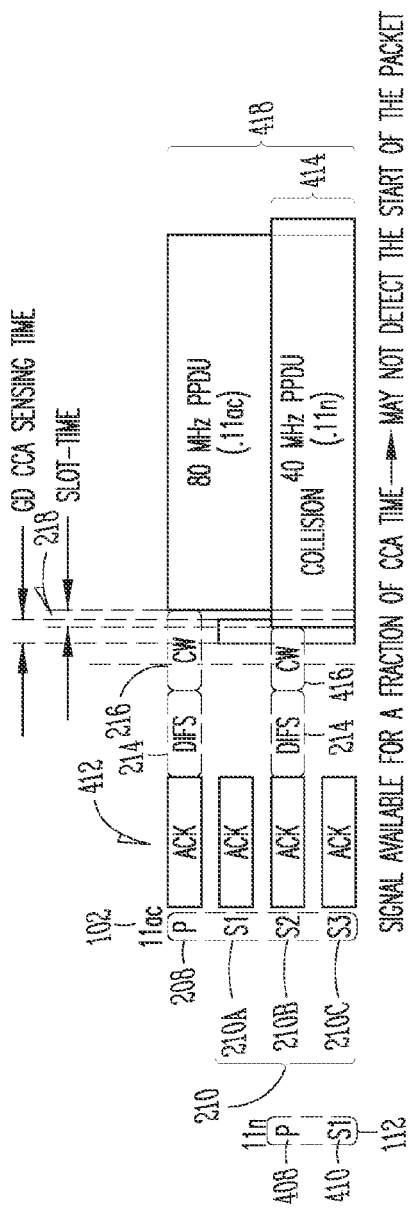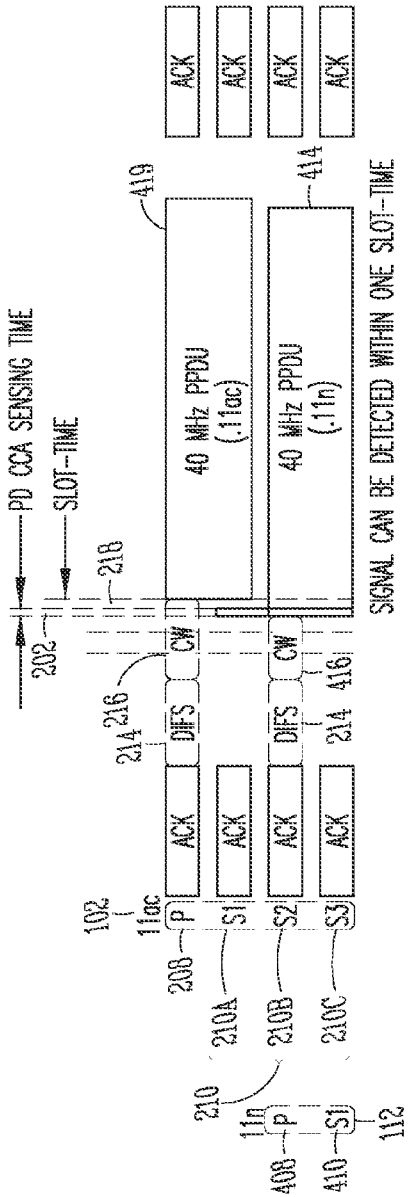

MULTI-CHANNEL COMMUNICATION STATION FOR COMMUNICATING A MULTI-CHANNEL PPDU AND METHODS OF REDUCING COLLISIONS ON SECONDARY CHANNELS IN MULTI-CHANNEL WIRELESS NETWORKS

This application is a continuation of U.S. patent application Ser. No. 12/825,843, filed on Jun. 29, 2010, now issued as U.S. Pat. No. 8,531,980, which is incorporated herein by reference in its entirety.

TECHNICAL FIELD

Embodiments pertain to wireless communications. Some embodiments relate to multi-channel wireless networks that communicate packets, such as Physical Layer Convergence Protocol (PLCP) protocol data units (PPDUs), over multiple channels. Some embodiments relate to wireless networks and devices that operate in accordance with one of the IEEE 802.11 standards, including the IEEE 802.11n and IEEE 802.11ac standards.

BACKGROUND

One issue with communicating over wireless networks is collisions between transmissions of stations of neighboring basic service sets (BSSs). Conventionally, a collision-avoidance protocol, such as a carrier-sense multiple-access with collision-avoidance (CSMA/CA) protocol, is employed to help reduce these collisions. As wireless networks use additional channels employing wider bandwidths for communicating, the potential for collisions increases. These additional channels may include a primary channel and one or more secondary channels. Collisions are particularly a concern between the transmissions of stations of different networks that do not use the same channel as a primary channel.

Thus, what are needed are multichannel communication stations and methods that may help reduce the probability of collisions. What are needed are multichannel communication stations and methods that can detect transmissions of other wireless networks on secondary channels to help reduce the probability of collisions.

BRIEF DESCRIPTION OF THE DRAWINGS

FIGS. 4A and 4B illustrate collision and collision avoidance in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
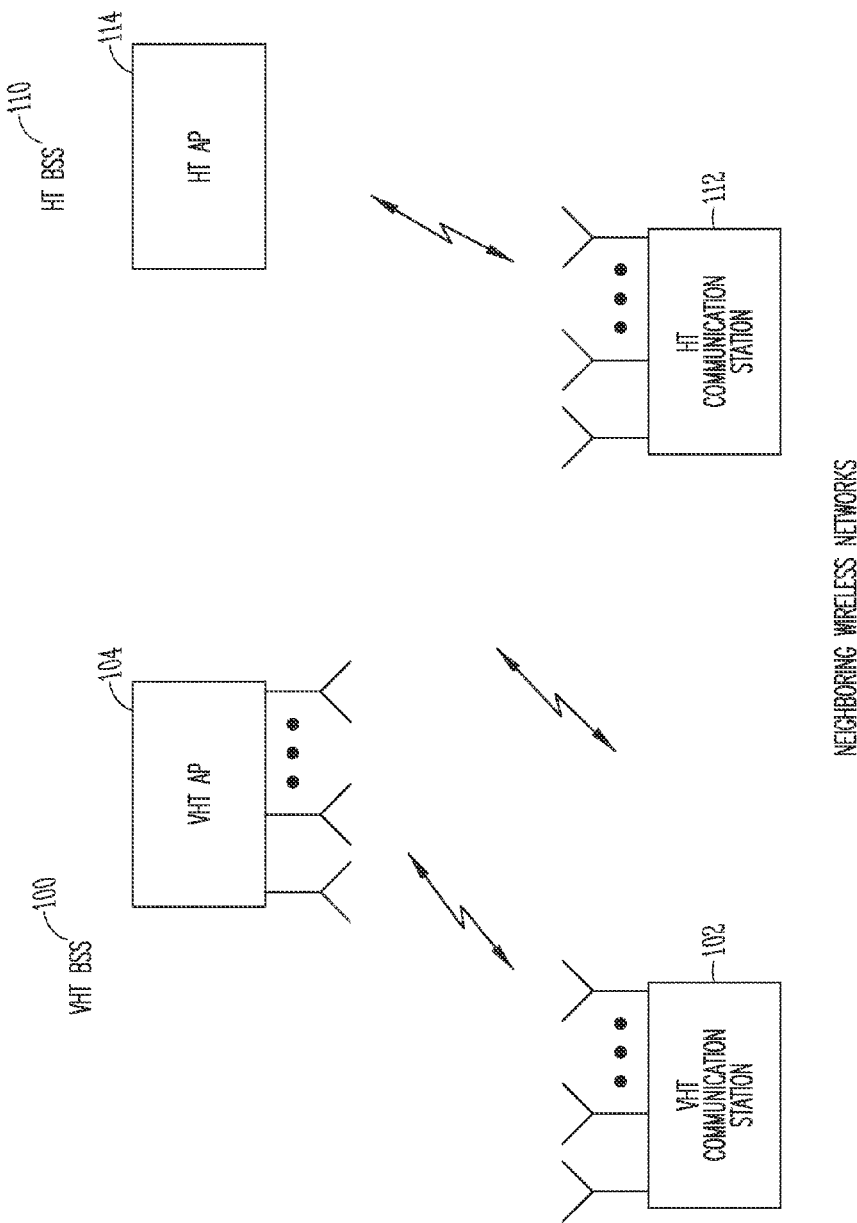
FIG. 1 illustrates neighboring wireless communication networks in accordance with some embodiments.

FIG. 1 illustrates neighboring wireless communication networks in accordance with some embodiments. The neighboring wireless communication networks may include two or more basic service sets (BSS), such as very-high throughput (VHT) BSS 100 and high-throughput (HT) BSS 110. VHT BSS 100 may include VHT access point (AP) 104 and one or more VHT communication stations (STA) 102, and HT BSS 110 may include neighboring HT AP 114 and one or more HT communication stations (STA) 112. VHT BSS 100 may be configured to operate in accordance with IEEE 802.11ac. HT BSS 110 may be configured to operate in accordance with IEEE 802.11n.

VHT BSS 100 may utilize a primary channel and up to three or more secondary channels. HT BSS 110, on the other hand, may be limited to using a primary channel and a single secondary channel. VHT communication station 102 and HT communication station 112 may utilize a contention-based collision-avoidance protocol such as the CSMA/CA protocol to contend for access.

When the primary channel utilized by VHT BSS 100 is not the same primary channel utilized by HT BSS 110, one or more of the secondary channels of VHT BSS 100 may reside on the primary channel of HT BSS 110. This may result in a potential increase in collisions.

In accordance with some embodiments, VHT communication station 102 may be configured to communicate a data unit, such as a PPDU, on a primary channel and up to three or more secondary channels, and HT communication station 112 may be configured to communicate a PPDU on a primary channel and up to one secondary channel. VHT communication station 102 may be configured to reduce collisions that may occur with HT communication station 112 by detecting packets on the secondary channels of VHT BSS 100. In these embodiments, VHT communication station 102 may perform short preamble detection and guard-interval detection during a contention window to detect a packet transmission on any one of the secondary channels. These embodiments are described in more detail below.

Figure 2:
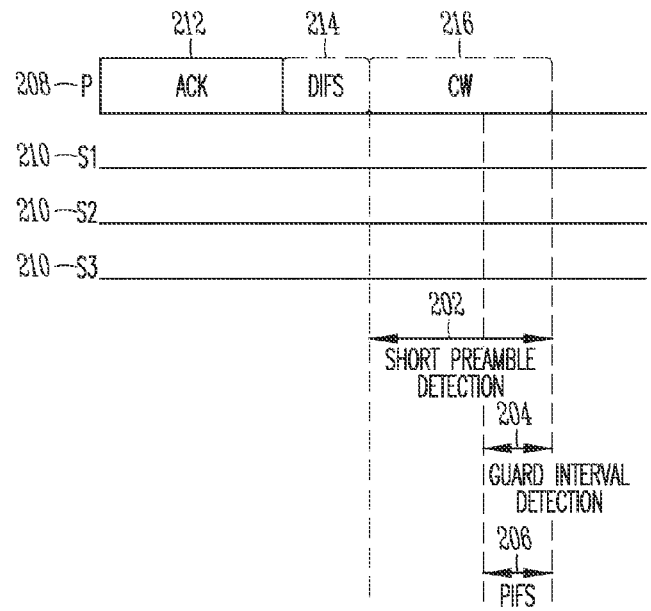
FIG. 2 illustrates a channel and congestion aware (CCA) technique in accordance with some embodiments.

FIG. 2 illustrates a CCA technique in accordance with some embodiments. Primary channel 208 and up to three or more secondary channels 210 may be used by a VHT communication station, such as VHT communication station 102 (FIG. 1). In accordance with embodiments, VHT communication station 102 may perform short-preamble detection (PD) 202 during a contention window (CW) 216 to detect packet transmissions on any one of the secondary channels 210 from a station such as HT communication station 112 (FIG. 1) of the HT BSS 110 (FIG. 1) starting within the contention window 216. VHT communication station 102 may also perform guard-interval detection (GD) 204 during the contention window 216 to detect a guard-interval of a packet transmission on any one of the secondary channels 210. The short-preamble detection 202 and the guard-interval detection 204 may be performed concurrently during the contention window 216. The guard-interval detection 204 and the short-preamble detection 202 are performed after a distributed coordination function (DCF) interframe space (DIFS) 214 which is provided, for example, after an acknowledge (ACK) packet 212. The ACK packet 212 may have been transmitted by AP 104 of a VHT BSS 100 (FIG. 1) or by AP 114 of a HT BSS 110 acknowledging a prior receipt of a data packet from a communication station. The ACK packet 212 may also have been transmitted by one of the communication stations.

The additional capability to perform short-preamble detection 202 on the secondary channels 210 to detect signals starting in the contention window 216 allows the VHT communication station 102 to detect packet transmissions on channels of a neighboring BSS, such as HT BSS 110. Unlike energy detection, which is conventionally performed to detect signals as part of a CSMA/CA protocol, the short-preamble detection 202 and the guard-interval detection 204 may detect packets that would not be able to be detected with energy detection techniques. For example, the short-preamble detection 202 and the guard-interval detection 204 may detect packets well below (e.g., up to 20 dB below) the energy detection threshold of energy detection techniques, which is conventionally about −62 dBm for secondary channels.

The packet transmissions detected on one of the secondary channels 210 by either the short-preamble detection 202 or the guard-interval detection 204 may be signal transmissions of HT communication station 112 of the neighboring HT BSS 110. The neighboring HT BSS 110 may have its primary channel co-located on one of the secondary channels 210 of the VHT BSS 100.

The VHT communication station 102 may utilize the primary channel 208 and up to three or more secondary channels 210 to provide transfer speeds of up to one gigabit-per second (Gbps) and greater. The transfer speed may depend on the number of antennas used as well as the usage bandwidth. Accordingly, the transfer speed may be significantly greater than the transfer rate of HT communication stations, such as HT communication station 112. The primary channel 208 may have a bandwidth of 20 MHZ, and each secondary channel 210 may have a bandwidth of 20 MHZ to provide a usage bandwidth of up to 80 MHz when three secondary channels 210 are used, and a usage bandwidth of up to 160 MHz when up to four additional secondary channels (not illustrated) are used. HT communication station 112, on the other hand, may be limited to using a single primary channel and a single secondary channel.

The short-preamble detection 202 may include detection of a predetermined sequence comprising a short preamble indicating a beginning of a packet. The guard-interval detection 204 may include a correlation (e.g., an autocorrelation) to detect a repeating pattern corresponding to a cyclic prefix of an OFDM symbol within one or more frames of a packet. The detection of a cyclic prefix by the guard-interval detection 204 may indicate a valid frame within the packet.

The short-preamble detection 202 may be performed to detect packet preambles on any one of the secondary channels 210 starting in time slots of the contention window 216. The short-preamble detection 202 is configured to be completed within a time slot of the contention window 216. In these embodiments, contention window 216 may comprise a plurality of time slots. The short-preamble detection 202 may be performed within any one or more of these time slots and may be completed during the time slot in which it was started. The short-preamble detection 202 may be configured to continuously search for a short packet preamble during the contention window 216.

The guard-interval detection 204 may be performed during an interval of a point-coordination function (PCF) interframe spacing (PIFS) 206 immediately preceding an expiration of a backoff counter of a contention-based collision-avoidance protocol such as the CSMA/CA protocol. When either the guard-interval detection 204 or the short-preamble detection 202 detects a packet transmission on one of the secondary channels 210, the secondary channel 210 is designated as a busy secondary channel. When both the guard-interval detection 204 and the short-preamble detection 202 fail to detect a packet transmission on one of the secondary channels 210, the secondary channel 210 is designated as an idle secondary channel.

The VHT communication station 102 may also be configured to refrain from transmitting on any one of the secondary channels 210 designated as a busy secondary channel. When the primary channel 208 is idle, the VHT communication station 102 may also be configured to transmit a PPDU on the primary channel 208 and any one or more of the secondary channels 210 designated as an idle secondary channel. A PPDU that is transmitted on the primary channel 208 and at least one of the secondary channels 210 may be referred to as a multichannel PPDU.

VHT communication station 102 may communicate on one primary channel 208 and three secondary channels 210. In some other embodiments, VHT communication station 102 may communicate on one primary channel 208 and seven secondary channels 210.

To determine if the primary channel 208 is idle or busy, the VHT communication station 102 is configured to perform an energy detection, short-preamble detection 202, and guard-interval detection 204 on the primary channel 208. The energy detection may be performed by measuring signal levels in the primary channel 208 during the contention window 216. The short-preamble detection 202 may be performed during the contention window 216 to detect packet transmissions on the primary channel 208. The guard-interval detection 204 may be performed during the contention window 216 to detect a guard-interval of a packet transmission on the primary channel 208. In this way, the VHT communication station 102 may determine whether the primary channel 208 is idle or busy. In these embodiments, the energy detection, the short-preamble detection 202 and the guard-interval detection 204 that are performed on the primary channel 208 may be performed concurrently during the contention window 216 along with the guard-interval detection 204 and the short-preamble detection 202 that is performed on the secondary channels 210. When the primary channel 208 is determined to be idle for a time period that includes the DIFS 214 plus the contention window 216, the VHT communication station 102 may transmit a packet on the primary channel 208 and any of the secondary channels 210 that are designated as idle secondary channels.

The VHT communication station 102 may also be configured to perform a CSMA/CA protocol using a DCF on the primary channel 208 for access to the primary channel 208 and refrain from performing a collision-avoidance protocol such as the CSMA/CA protocol on the secondary channels 210. In these embodiments, the collision-avoidance protocol is performed on the primary channel 208 and is not performed on the secondary channels 210.

The VHT communication station 102 is configured to communicate with an access point 104 over a 20 MHz primary channel 208 and up to three or more 20 MHz secondary channels 210 in accordance with IEEE 802.11ac. In these embodiments, the primary channel 208 may be used for performing the CSMA/CA protocol as well as for communicating data packets, such as PPDUs, with the access point 104. One or more of the secondary channels 210 along with the primary channel 208 may be used for communicating multi-channel data packets, such as multi-channel PPDUs. For example, when the channels are 20 MHz channels, a 20 MHz PPDU may be communicated when the VHT communication station 102 uses only the primary channel 208. A 40 MHz multi-channel PPDU may be communicated when the VHT communication station 102 uses the primary channel 208 and one of the secondary channels 210. A 60 MHz multi-channel PPDU may be communicated when the VHT communication station 102 uses the primary channel 208 and two of the secondary channels 210. An 80 MHz multi-channel PPDU may be communicated when the VHT communication station 102 uses the primary channel 208 and three of the secondary channels 210. Up to a 160 MHz multi-channel PPDU may be communicated when the VHT communication station 102 uses the primary channel 208 and up to four additional secondary channels (not illustrated). For a multi-channel PPDU, different information may be transmitted on each 20 MHz channel utilized by the multi-channel PPDU.

In some of these embodiments, the HT BSS 110 is configured to communicate in accordance with an IEEE 801.11n, which uses one primary channel and one secondary channel for communicating. The packets detected on a secondary channel 210 by either the short-preamble detection 202 or the guard-interval detection 204 may be transmissions on a primary or secondary channel of the HT BSS 110 (FIG. 1). Accordingly, collisions with a neighboring BSS may be reduced and possibly eliminated. It should be noted that collisions between stations of the same BSS are generally not an issue because each BSS may use the same primary channel for both 802.11ac stations and 802.11n stations, and stations can easily detect packet transmissions on the primary channel of their own BSS. In the same BSS, 11n and 11ac stations use the same primary channel, so they can detect each other's transmission without a collision problem due to undetected transmissions in a secondary channel.

Figure 3:
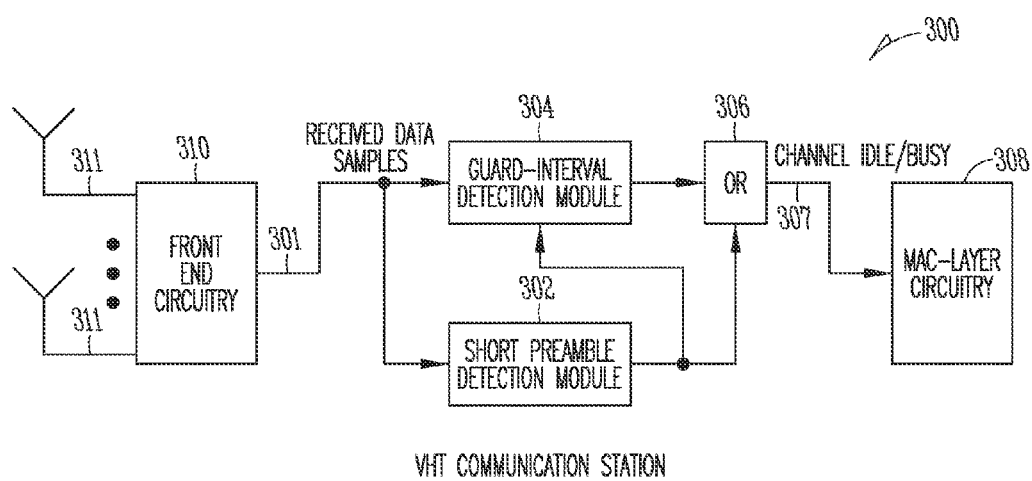
FIG. 3 illustrates a functional block diagram of a very-high throughput (VHT) communication station in accordance with some embodiments.

FIG. 3 illustrates a functional block diagram of a VHT communication station in accordance with some embodiments. VHT communication station 300 may include, among other things, front-end circuitry 310 to receive signals through spatially-diverse antennas 311, a short-preamble detection module 302, a guard-interval detection module 304, logical 'OR' circuitry 306, and medium-access control (MAC) layer circuitry 308. VHT communication station 300 may be suitable for use as VHT communication station 102 (FIG. 1), although other configurations may also be suitable.

The short-preamble detection module 302 may be configured to perform short-preamble detection 202 (FIG. 2) on received data samples 301. The guard-interval detection module 304 may be configured to perform guard-interval detection 204 (FIG. 2) on received data samples 301. The logical 'OR' circuitry 306 may be configured to provide either a channel busy or channel idle indication 307 to the MAC layer circuitry 308 to designate the primary channel 208 (FIG. 2) and each of the secondary channels 210 (FIG. 2) as either busy or idle. In these embodiments, the logical 'OR' circuitry 306 may be configured to receive a detection output from the short-preamble detection 202 and the guard-interval detection 204 and for the primary channel 208 and each secondary channel 210 and to provide either a channel busy or channel idle indication 307 to MAC layer circuitry 308. The output of the logical 'OR' circuitry 306 may allow the MAC layer circuitry 308 to designate the primary channel 208 and each secondary channel 210 as either idle or busy.

VHT communication station 300 may implement a MIMO communication technique using the plurality of spatially-diverse antennas 311 to communicate multiple data streams concurrently over the primary channel 208 and the up to three or more secondary channels 210. In these embodiments, the VHT communication station 300 may be configured to perform the guard-interval detection 204 and the short-preamble detection 202 on the secondary channels 210 using a single one of the antennas 311, although this is not a requirement as VHT communication station 300 may utilize up to four or more of antennas 311 to perform the guard-interval detection 204 and the short-preamble detection 202 on the secondary channels 210.

Although VHT communication station 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application-specific integrated circuits (ASICs), radio-frequency integrated circuits (RFICs) and combinations of various hardware and logic circuitry for performing at least the functions described herein. The functional elements of VHT communication station 300 may refer to one or more processes operating on one or more processing elements.

VHT communication station 300 may be a portable wireless communication device, such as a personal digital assistant (PDA), a laptop or portable computer with wireless communication capability, a smart phone, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

VHT communication station 300 operating within VHT BSS 100 may be configured to communicate orthogonal frequency division multiplexed (OFDM) communication signals over each of its channels including primary channel 208 and secondary channels 210. HT BSS 110 (FIG. 1) may also be configured to communicate OFDM communication signals over each of its channels. The OFDM signals may comprise symbols modulated on a plurality of orthogonal subcarriers. Each channel may comprise a predetermined number of these orthogonal subcarriers. In some example embodiments, each channel may comprise fifty-two subcarriers although this is not a requirement.

Antennas 311 may comprise one or more directional or omnidirectional antennas, including, for example, dipole antennas, monopole antennas, patch antennas, loop antennas, microstrip antennas or other types of antennas suitable for transmission of RF signals. Instead of two or more antennas, a single antenna with multiple apertures may be used. In these embodiments, each aperture may be considered a separate antenna. In some multiple-input, multiple-output (MIMO) embodiments, antennas 311 may be effectively separated to take advantage of spatial diversity and the different channel characteristics that may result between each of antennas 311 and VHT access point 104 (FIG. 1). Antennas 311 may be separated by up to $\frac{1}{10}$ of a wavelength or more.

FIGS. 4A and 4B illustrate collision and collision-avoidance in accordance with some embodiments. As illustrated in FIGS. 4A and 4B, VHT communication station 102 of VHT BSS 100 (FIG. 1) may communicate on primary channel 208 and up to three secondary channels 210 illustrated as secondary channel 210A, secondary channel 210B and secondary channel 210C. HT communication station 112 of HT BSS 110 (FIG. 1) may communicate on a primary channel 408 and secondary channel 410. In this example, the primary channel 408 used by that HT communication station 112 coincides with secondary channel 210B used by VHT communication station 102. The secondary channel 410 used by HT communication station 112 coincides with secondary channel 210C used by VHT communication station 102.

As illustrated in FIG. 4A, the VHT communication station 102 may have just completed an 80 MHz multichannel PPDU transmission over the primary channel 208 and all three secondary channels 210A, 210B and 210C, which is acknowledged on each channel acknowledge packets 412. If the VHT communication station 102 has additional data to transmit, the VHT communication station 102 may start by deferring and sensing the primary channel 208 for the time period of DIFS 214 plus the contention window 216 to determine if the primary channel 208 is idle or busy.

As discussed above, the VHT communication station 102 may also sense the three secondary channels 210A, 210B and 210C. Because HT communication station 112 of neighboring HT BSS 110 knows the end of the prior transmission of the VHT communication station 102, the HT communication station 112 may also try to access the medium by deferring for the time period of DIFS 214 plus the contention window 416. In this example, the contention window 416 of the HT communication station 112 is one time-slot less than the contention window 216 of the VHT communication station 102 (e.g., due to random backoff).

If the HT communication station 112 determines that at least some channels are idle, it may transmit a multi-channel PPDU 414 on primary channel 408 and secondary channel 410, which correspond to the secondary channels 210B and 210C utilized by VHT communication station 102. If the VHT communication station 102 does not perform short-preamble detection 202 in the secondary channels 210 and because it may require between 10~14 micro-seconds to complete a CCA for packet transmission, the VHT communication station 102 would have to start guard-interval detection 204 at least one slot-time before the last slot-time 218 of its contention window 216. However, in this example, the multi-channel PPDU 414 transmitted by HT communication station 112 starts from the last slot-time 218 of the contention window 216 of VHT communication station 102 and thus it does not fully overlap with the GD CCA sensing time for reliable signal detection. Thus, the VHT communication station 102 fails to detect the multi-channel PPDU 414 transmitted by HT communication station 112 starting from the last slot-time 218 of the contention window 216. As a result, the VHT communication station 102 believes the secondary channels 210A, 210B and 21C are idle and may transmit a multi-channel PPDU 418 over all four channels (208, 210A, 210B, 210C), which collides with the transmission of PPDU 414 of HT communication station 112. In this example, it is assumed that the signal level in either secondary channel 210B or 210C is below an energy detection threshold level but above the short-preamble or the guard-interval detection levels.

As illustrated in FIG. 4B, if the VHT communication station 102 performs short-preamble detection 202 (FIG. 2) and guard-interval detection 204 (FIG. 2) during the contention window 216, the PPDU 414 of HT communication station 112 may be detected, causing VHT communication station 102 to designate secondary channels 210B and 210C as busy. As a result, VHT communication station 102 may transmit a multi-channel PPDU 419 on primary channel 208 and secondary channel 210A, avoiding a collision with PPDU 414. In this example, since short-preamble detection 202 may take only about four microseconds to detect a signal in one of the second channels 210A, 210B or 210C, the short-preamble detection 202 may be completed in the last time slot of the contention window 216 of VHT communication station 102.

Performing short-preamble detection 202 may be used to achieve a rapid timing sync with a transmitted frame, which may be used to help identify positions of the guard-intervals of OFDM symbols transmitted on the secondary channels 210. Knowledge of the guard-intervals decreases the probability of a false detection. As a result, an increase in detection sensitivity may be achieved when guard-interval detection follows preamble detection than can be achieved using guard-interval detection alone. In these embodiments, the predetermined structure of a PPDU may include a short-training field (STF) followed by a long-training field (LTF) followed by OFDM symbols. Each OFDM symbol may have a guard-interval. In these embodiments, when the short-preamble detection module 302 identifies the start of the PPDU (e.g., by identifying the short-training field), the guard interval detection module 304 may be configured to identify where the guard intervals of the PPDU are likely to occur, thereby improving sensitivity for detecting the guard intervals that follow the long-training field. The short-preamble detection module 302 may provide an indication to the guard-interval detection module 304 that it has detected a short preamble, such as the short-training field.

HT communication stations 112 of HT BSS 110 generally only perform energy detection in their secondary channel 410 to detect signal transmissions because it is a less complex technique. As a result, HT communication stations 112 may fail to detect some transmissions on their secondary channel 410 from stations of a neighboring BSS, such as VHT BSS 100, resulting in an increase in collisions on secondary channel 410. Since HT BSS 110 utilizes only a single secondary channel 410, the performance degradation may be more tolerable than for VHT BSS 100, which uses from between three and seven secondary channels 210. Failure of the VHT communication station 102 of VHT BSS 100 to detect transmissions on its secondary channels 210, however, may degrade network performance significantly. Therefore, the improved transmission detection technique disclosed herein may be more important for VHT communication station 102, particularly for VHT communication stations configured to operate in accordance with IEEE 802.11ac.

Figure 5:
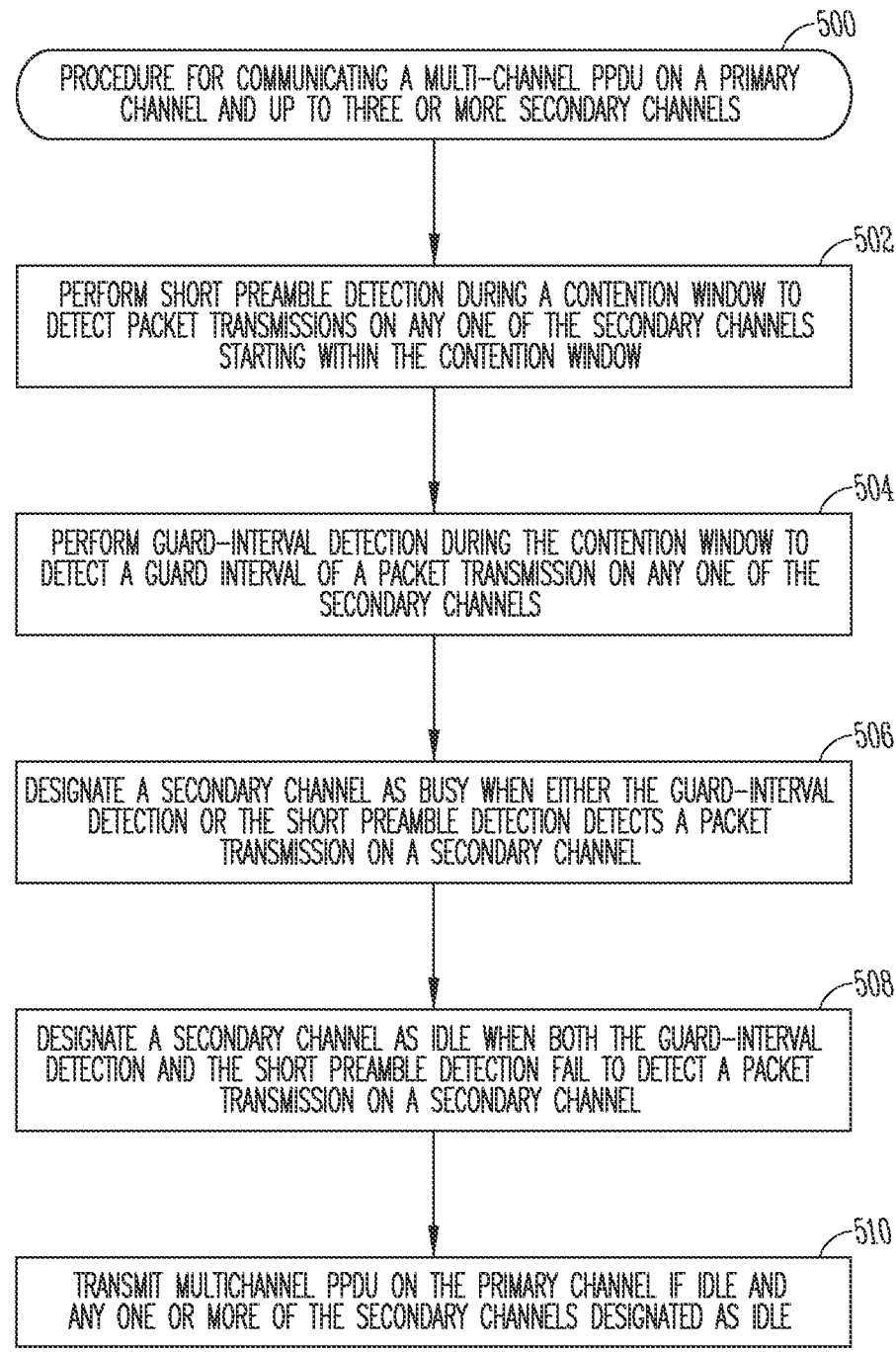
FIG. 5 is a procedure for communicating a multi-channel PPDU on a primary channel and up to three or more secondary channels in accordance with some embodiments.

FIG. 5 is a procedure for communicating a multi-channel PPDU on a primary channel and up to three or more secondary channels in accordance with some embodiments. Procedure 500 may be performed by a VHT communication station, such as VHT communication station 102 (FIG. 1).

Operation 502 comprises performing short-preamble detection during a contention window to detect packet transmissions on any one of the secondary channels starting within the contention window.

Operation 504 comprises performing guard-interval detection during the contention window to detect a guard interval of a packet transmission on any one of the secondary channels. The short-preamble detection and the guard-interval detection may be performed concurrently during the contention window.

Operation 506 comprises designating a secondary channel as busy when either the guard-interval detection or the short-preamble detection detects a packet transmission on the secondary channel.

Operation 508 comprises designating a secondary channel as idle when both the guard-interval detection and the short-preamble detection fail to detect a packet transmission on a secondary channel. In operation 510, the VHT communication station may be free to transmit a multichannel PPDU on a primary channel and any one or more of the secondary channels that are idle.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A communication station comprising:
   a transceiver configured to communicate on a primary 20 MHz channel and up to three or more secondary channels including a secondary 20 MHz channel, a secondary 40 MHz channel and a secondary 80 MHz channel for operating channel widths of 20 MHz, 40 MHz, 80 MHz and 160 MHz; and
   processing circuitry, to configure the transceiver, for Clear Channel Assessment-Energy Detect (CCA-ED), to:
   issue a primary channel busy condition when a 20 MHz data unit is detected in the primary 20 MHz channel at or above a first predetermined energy level;
   issue a secondary channel busy condition when a primary channel busy condition has not been issued and when any signal is detected within the secondary 20 MHz channel at or above a second predetermined energy level; and
   issue a secondary channel busy condition when a primary channel busy condition has not been issued and when a 20 MHz data unit is detected in the secondary 20 MHz channel or a 20 MHz sub-channel of either the secondary 40 MHz channel or the secondary 80 MHz channel at or above a third predetermined energy level,
   wherein a 20 MHz data unit in the primary 20 MHz channel an energy level at or above the first predetermined energy level and below the third predetermined energy level is detected using preamble detection followed by a guard interval detection, the preamble detection detecting a start of a Physical Layer Convergence Protocol (PLCP) protocol data units (PPDU).

2. The communication station of claim 1 wherein the 20 MHz data unit is a 20 MHz Physical Layer Convergence Protocol (PLCP) protocol data unit (PPDU).

3. The communication station of claim 2 wherein the second predetermined energy level is greater than the third predetermined energy level, and
   wherein the third predetermined energy level is greater than the first predetermined energy level.

4. The communication station of claim 3 station is further configured to:
   perform an ED technique to detect a 20 MHz PPDU in the primary 20 MHz channel at or above the first predetermined energy level; and
   perform an ED technique to detect a 20 MHz PPDU in the secondary 20 MHz channel or a 20 MHz sub-channel of either the secondary 40 MHz channel or the secondary 80 MHz channel at or above the third predetermined energy level.

5. A communication station comprising:
   a transceiver configured to communicate on a primary 20 MHz channel and up to three or more secondary channels including a secondary 20 MHz channel, a secondary 40 MHz channel and a secondary 80 MHz channel for operating channel widths of 20 MHz, 40 MHz, 80 MHz and 160 MHz and to perform channel assessment in accordance with an energy detection (ED) technique; and
   processing circuitry, wherein as part of the ED technique, the processing circuitry is to configure the transceiver to:
   issue a primary channel busy condition when a 20 MHz data unit is detected in the primary 20 MHz channel at or above a first predetermined energy level; and
   issue a secondary channel busy condition when a primary channel busy condition has not been issued and when:
   any signal is detected within the secondary 20 MHz channel at or above a second predetermined energy level; or
   a 20 MHz data unit is detected in the secondary 20 MHz channel or a 20 MHz sub-channel of either the secondary 40 MHz channel or the secondary 80 MHz channel at or above a third predetermined energy level,
   wherein the 20 MHz data unit is a 20 MHz Physical Layer Convergence Protocol (PLCP) protocol data unit (PPDU),
   wherein the second predetermined energy level is greater than the third predetermined energy level, and
   wherein the third predetermined energy level is greater than the first predetermined energy level, and
   wherein the station is further configured to:
   perform preamble detection to detect a 20 MHz PPDU in the primary 20 MHz channel at or above the first predetermined energy level; and
   perform guard interval detection to detect a 20 MHz PPDU in the secondary 20 MHz channel or a 20 MHz sub-channel of either the secondary 40 MHz channel or the secondary 80 MHz channel at or above the third predetermined energy level.

6. A method performed by a communication station comprising:
   configuring a transceiver to communicate on a primary 20 MHz channel and up to three or more secondary channels including a secondary 20 MHz channel, a secondary 40 MHz channel and a secondary 80 MHz channel for operating channel widths of 20 MHz, 40 MHz, 80 MHz and 160 MHz; and
   performing channel assessment for Clear Channel Assessment-Energy Detect (CCA-ED),
   wherein as part of the CCA-ED, the method includes:
   issuing a primary channel busy condition when a 20 MHz data unit is detected in the primary 20 MHz channel at or above a first predetermined energy level;
   issuing a secondary channel busy condition when a primary channel busy condition has not been issued and when any signal is detected within the secondary 20 MHz channel at or above a second predetermined energy level; and
   issue a secondary channel busy condition when a primary channel busy condition has not been issued and when a 20 MHz data unit is detected in the secondary 20 MHz channel or a 20 MHz sub-channel of either the secondary 40 MHz channel or the secondary 80 MHz channel at or above a third predetermined energy level,
   wherein a 20 MHz data unit in the primary 20 MHz channel having an energy level at or above the first predetermined energy level and below the third predetermined energy level is detected using preamble detection followed by a guard interval detection, the preamble detection detecting a start of a Physical Layer Convergence Protocol (PLCP) protocol data units (PPDU).

7. The method of claim 6 wherein the 20 MHz data unit is a 20 MHz Physical Layer Convergence Protocol (PLCP) protocol data unit (PPDU).

8. The method of claim 7 wherein the second predetermined energy level is greater than the third predetermined energy level, and
wherein the third predetermined energy level is greater than the first predetermined energy level.

9. The method of claim 7 further comprising:
performing an ED technique to detect a 20 MHz PPDU in the primary 20 MHz channel at or above the first predetermined energy level; and
performing an ED technique to detect a 20 MHz PPDU in the secondary 20 MHz channel or a 20 MHz sub-channel of either the secondary 40 MHz channel or the secondary 80 MHz channel at or above the third predetermined energy level.

10. A method performed by a communication station comprising:
configuring a transceiver to communicate on a primary 20 MHz channel and up to three or more secondary channels including a secondary 20 MHz channel, a secondary 40 MHz channel and a secondary 80 MHz channel for operating channel widths of 20 MHz, 40 MHz, 80 MHz and 160 MHz; and
performing channel assessment in accordance with an energy detection (ED) technique,
wherein as part of the ED technique, the method includes:
issuing a primary channel busy condition when a 20 MHz data unit is detected in the primary 20 MHz channel at or above a first predetermined energy level; and
issuing a secondary channel busy condition when a primary channel busy condition has not been issued and when:
any signal is detected within the secondary 20 MHz channel or above a second predetermined energy level; or
a 20 MHz data unit is detected in the secondary 20 MHz channel or a 20 MHz sub-channel of either the secondary 40 MHz channel or the secondary 80 MHz channel at or above a third predetermined energy level,
wherein the 20 MHz data unit is a 20 MHz Physical Layer Convergence Protocol (PLCP) protocol data unit (PPDU),
wherein the second predetermined energy level is greater than the third predetermined energy level, and
wherein the third predetermined energy level is greater than the first predetermined energy level, and
wherein the method further comprises:
performing preamble detection to detect a 20 MHz PPDU in the primary 20 MHz channel at or above the first predetermined energy level; and
performing guard interval detection to detect a 20 MHz PPDU in the secondary 20 MHz channel or a 20 MHz sub-channel of either the secondary 40 MHz channel or the secondary 80 MHz channel at or above the third predetermined energy level.

11. A non-transitory computer-readable storage medium that stores instructions for execution by one or more processors of a device that is configurable to communicate on a primary 20 MHz channel and up to three or more secondary channels including a secondary 20 MHz channel, a secondary 40 MHz channel and a secondary 80 MHz channel for operating channel widths of 20 MHz, 40 MHz, 80 MHz and 160 MHz;
wherein the instructions configure the device to perform channel assessment for CCA-Energy Detect (Clear Channel Assessment-ED),
wherein as part of the CCA-ED, the one or more processors are configured to:
issue a primary channel busy condition when a 20 MHz data unit is detected in the primary 20 MHz channel at or above a first predetermined energy level;
issue a secondary channel busy condition when a primary channel busy condition has not been issued and when any signal is detected within the secondary 20 MHz channel at or above a second predetermined energy level; and
issue a secondary channel busy condition when a primary channel busy condition has not been issued and when a 20 MHz data unit is detected in the secondary 20 MHz channel or a 20 MHz sub-channel of either the secondary 40 MHz channel or the secondary 80 MHz channel at or above a third predetermined energy level,
wherein a 20 MHz data unit in the primary 20 MHz channel having an energy level at or above the first predetermined energy level and below the third predetermined energy level is detected using preamble detection followed by a guard interval detection, the preamble detection detecting a start of a Physical Layer Convergence Protocol (PLCP) protocol data units (PPDU).

12. The non-transitory computer-readable storage medium of claim 11 wherein the 20 MHz data unit is a 20 MHz Physical Layer Convergence Protocol (PLCP) protocol data unit (PPDU).

13. The non-transitory computer-readable storage medium of claim 12 wherein the second predetermined energy level is greater than the third predetermined energy level, and
wherein the third predetermined energy level is greater than the first predetermined energy level.

14. The non-transitory computer-readable non-transitory computer-readable storage medium of claim 13 wherein the one or more processors are further configured to:
perform an ED technique to detect a 20 MHz PPDU in the primary 20 MHz channel at or above the first predetermined energy level; and
perform an ED technique to detect a 20 MHz PPDLI in the secondary 20 MHz channel or a 20 MHz sub-channel of either the secondary 40 MHz channel or the secondary 80 MHz channel at or above the third predetermined energy level.

15. A non-transitory computer-readable storage medium that stores instructions for execution by one or more processors of a device that is configurable to communicate on a primary 20 MHz channel and up to three or more secondary channels including a secondary 20 MHz channel, a secondary 40 MHz channel and a secondary 80 MHz channel for operating channel widths of 20 MHz, 40 MHz, 80 MHz and 160 MHz;
wherein the instructions configure the device to perform channel assessment in accordance with an energy detection (ED) technique,
wherein as part of the ED technique, the one or more processors are configured to:
issue a primary channel busy condition when a 20 MHz data unit is detected in the primary 20 MHz channel at or above a first predetermined energy level; and
issue a secondary channel busy condition when a primary channel busy condition has not been issued and when:

any signal is detected within the secondary 20 MHz channel at or above a second predetermined energy level; or a 20 MHz data unit is detected in the secondary 20 MHz channel or a 20 MHz sub-channel of either the secondary 40 MHz channel or the secondary 80 MHz channel at or above a third predetermined energy level, wherein the 20 MHz data unit is a 20 MHz Physical Layer Convergence Protocol (PLCP) protocol data unit (PPDU), wherein the second predetermined energy level is greater than the third predetermined energy level, wherein the third predetermined energy level is greater than the first predetermined energy level, and wherein the one or more processors are further configured to:

perform preamble detection to detect a 20 MHz PPDU in the primary 20 MHz channel at or above the first predetermined energy level; and perform guard interval detection to detect a 20 MHz PPDU in the secondary 20 MHz channel or a 20 MHz sub-channel of either the secondary 40 MHz channel or the secondary 80 MHz channel at or above the third predetermined energy level.

* * * * *

UNITED STATES PATENT AND TRADEMARK OFFICE
CERTIFICATE OF CORRECTION

PATENT NO. : 9,509,465 B2
APPLICATION NO. : 13/949517
DATED : November 29, 2016
INVENTOR(S) : Park et al.

Page 1 of 1

It is certified that error appears in the above-identified patent and that said Letters Patent is hereby corrected as shown below:

In the Claims

In Column 9, Line 21, in Claim 1, delete "circuitry," and insert --circuitry--, therefor In Column 9, Line 38, in Claim 1, after "channel", insert --having--, therefor In Column 9, Line 52, in Claim 4, after "claim 3", insert --wherein the--, therefor In Column 11, Line 38, in Claim 10, after "channel", insert --at--, therefor In Column 12, Line 39, in Claim 14, after "The", delete "non-transitory computer-readable", therefor In Column 12, Line 45, in Claim 14, delete "PPDLI" and insert --PPDU--, therefor In Column 13, Line 9, in Claim 15, delete "PL CP" and insert --PLCP--, therefor Signed and Sealed this
Eighteenth Day of June, 2019

Andrei Iancu
*Director of the United States Patent and Trademark Office*